July 25, 1933.   W. G. HOFFMAN ET AL   1,919,655
PURIFICATION OF OIL
Filed July 12, 1929   3 Sheets-Sheet 3

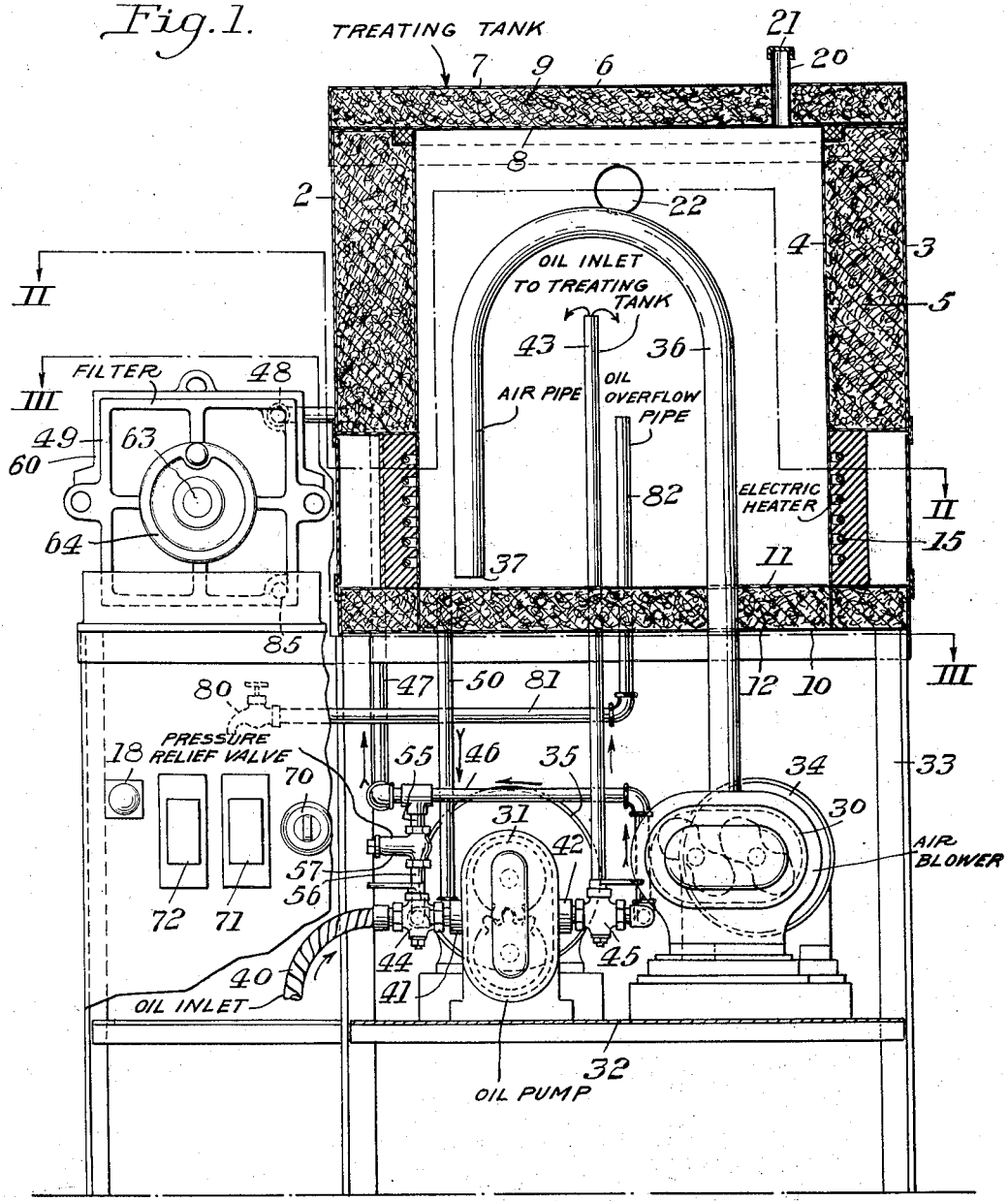

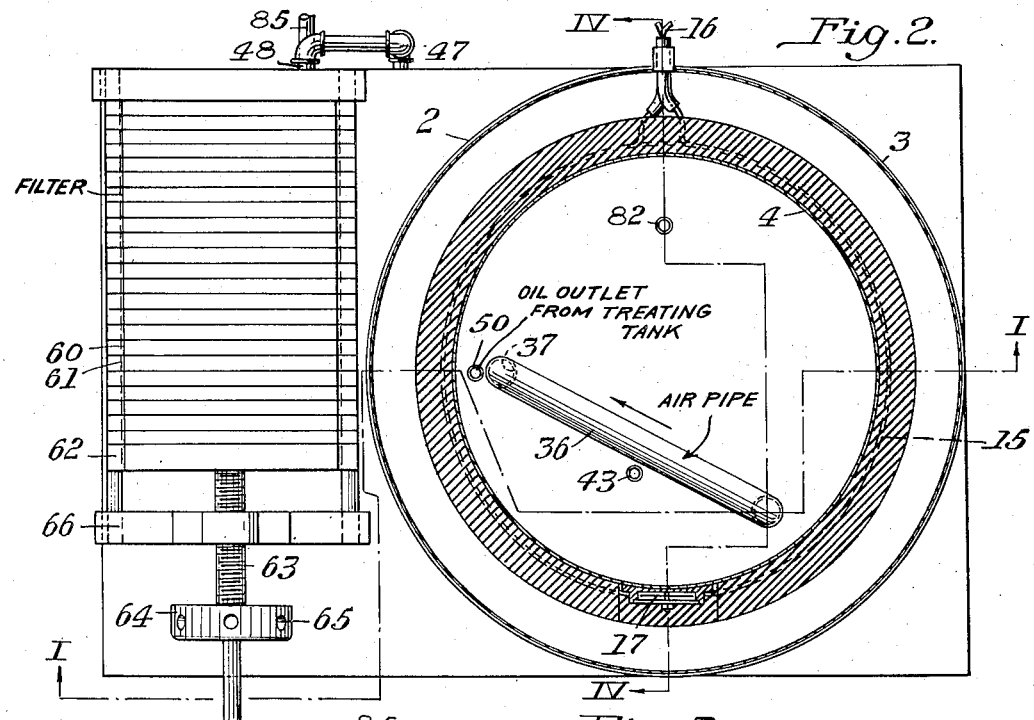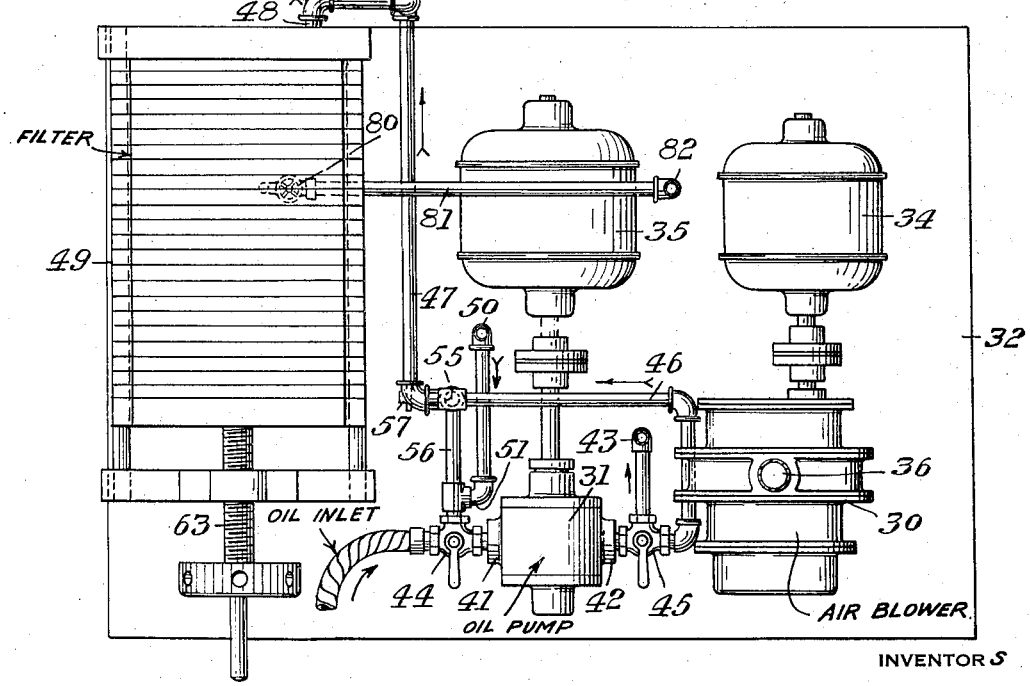

INVENTORS
Walter G. Hoffman
James R. Miller
by Byrnes, Stebbins & Parmelee
Attys.

Patented July 25, 1933

1,919,655

UNITED STATES PATENT OFFICE

WALTER G. HOFFMAN, OF MOUNT LEBANON, AND JAMES R. MILLER, OF PITTSBURGH, PENNSYLVANIA, ASSIGNORS, BY MESNE ASSIGNMENTS, TO BOCJL CORPORATION, OF PITTSBURGH, PENNSYLVANIA, A CORPORATION OF DELAWARE

PURIFICATION OF OIL

Application filed July 12, 1929. Serial No. 377,763.

This invention relates generally to the purification of oil and more particularly to a process for treating used oils in order to remove therefrom impurities such as water, gasoline, solid carbon paticles and other impurities, and to neutralize acid constituents thereof.

In accordance with our invention we introduce into a tank a mixture of oil, an alkali, and preferably diatomaceous earth, and blow air through the mixture in order to agitate it. The mixture is heated to the desired temperature in order to expel the water and lighter hydrocarbons, such as gasoline, and to aid in the reaction of the alkali with the acid constituents of the oil. Thereafter the mixture is passed from the heating tank to a filter which removes the diatomaceous earth and any solid particles of carbon or other material which have been deposited in the oil.

In the accompanying drawings, which illustrates the present preferred embodiment of our invention, Figure 1 is a vertical section, parts being shown in elevation, the section being taken on the line I—I of Figure 2.

Figure 2 is a horizontal section on the line II—II of Figure 1,

Figure 3 is a horizontal section on the line III—III of Figure 1, and

Figure 4:
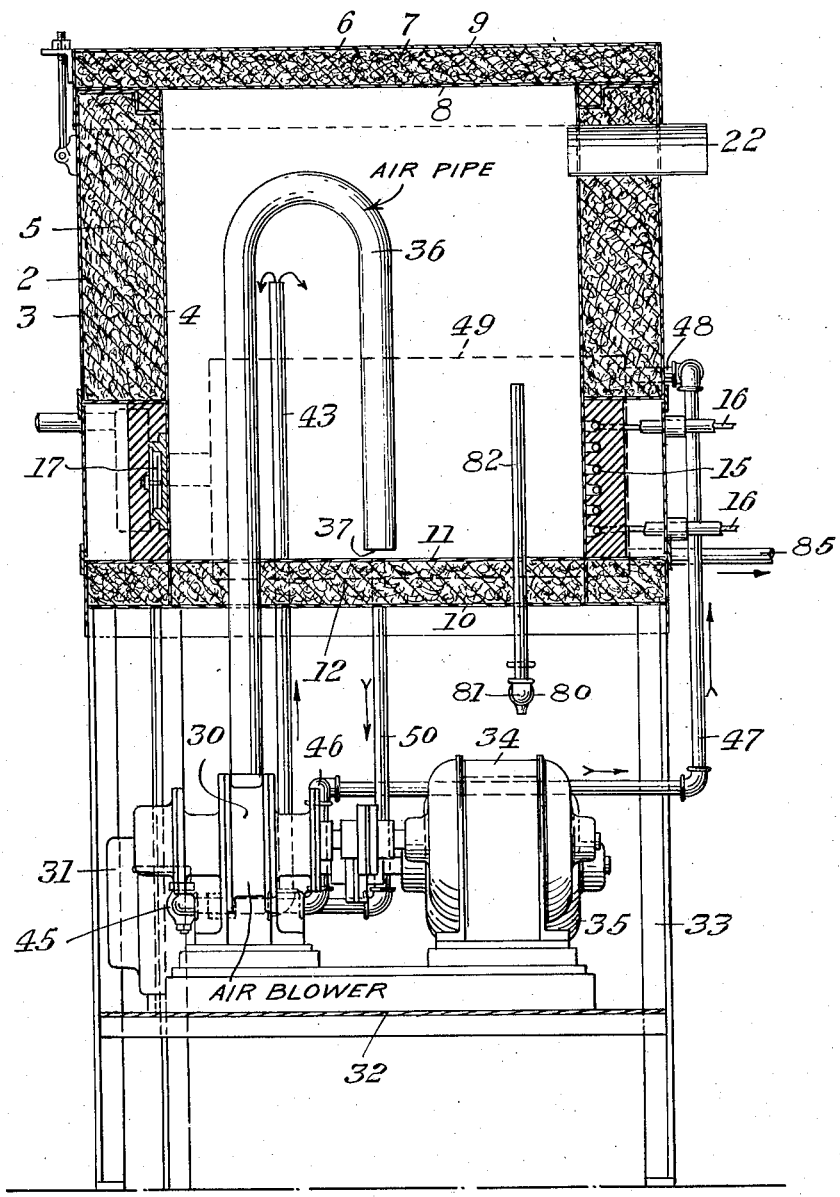
Figure 4 is a vertical section on the line IV—IV of Figure 2.

Referring to the accompanying drawings, there is shown a heating tank 2 comprising an outer casing 3 and an inner casing 4 of sheet metal. The casing is lined with an insulating material 5 such as mineral wool. The tank is provided with a cover 6 also comprising an outer casing 7, an inner casing 8 and insulation 9. The bottom of the tank 2 is similar in construction to the cover 6 and likewise comprises outer and inner casings 10 and 11, respectively, the space between which is filled with insulating material 12, such as mineral wool.

A heating coil 15 is arranged between the inner and outer casings 3 and 4 and is connected to a suitable source of current through the leads 16. Connected in series with the heating coil 15 is a thermostat 17 which shuts off the current when the desired temperature as been reached in the tank. The theremostat 17 is connected by means not shown in circuit with a signal light 18 shown in Figure 1, which lights when the current in the heating coil 15 is shut off after the desired temperature in the tank has been reached.

The cover 6 of the tank has a pipe 20 extending therethrough, the outer end of the pipe being normally closed by a cap 21. The pipe is for the purpose of enabling a thermometer or other instrument to be inserted into the tank in order to check up on the temperature of the oil being treated. A vent pipe 22 shown in Figure 4 extends through the rear wall of the tank 2.

An air blower 30 and an oil pump 31 are mounted on a shelf 32 supported between frame-work 33, which also supports the heating tank 2. The air blower is driven by a motor 34 and the oil pump by a motor 35. The air blower has a pipe 36 connected at one end to the blower and having its opposite end extending upwardly into the tank and then downwardly in a U-shape, so that the delivery end 37 of the pipe lies adjacent the bottom of the tank. The mixture of oil and chemicals is supplied to the tank through a pipe 40. The pipe 40 leads to the inlet 41 of the oil pump 31, and the outlet 42 of the pump is connected to a pipe 43 which extends upwardly into the tank.

The inlet 41 and the outlet 42 of the oil pump are provided with three-way valves 44 and 45, respectively. The outlet of the valve 45 is connected by pipes 46 and 47 to the inlet 48 of a filter 49. A heating tank outlet pipe 50 has its upper end in communication with the tank and its lower end 51 in communication with the three-way valve 44 arranged in the inlet to the oil pump 31. A pipe 55 is connected at its upper end to the pipe 46 and at its lower end to a pipe 56 which leads to the three-way valve 44.

The pipe 55 has a relief valve 57 arranged therein, which, in case of excess pressure due to clogging of the filter 49, causes the oil to pass through the pipes 55 and 56 to the inlet of the oil pump 31, rather than forcing the oil through the filter 49 against this excess pressure.

The filter 49 is of the press type commonly used in filtering solids from liquids, and comprises a series of alternately arranged plates 60 and frames 61 having filter paper, not shown, arranged therebetween. The press has a movable end plate 62 which may be forced inwardly to force the plates, frames and filters closely together. In the arrangement shown, the end plate 62 is carried by a screw 63 having an enlarged head 64 provided with openings 65, in which a bar may be inserted to turn the head and screw. The screw 63 is mounted in a frame 66 so that upon rotation of the head 64 the end plate 62 compresses the plates 60 and frames 61.

The current for the heating coil 15 is controlled by a switch 70, shown in Figure 1, and the motors 34 and 35 are controlled from panels 71 and 72, respectively.

In purifying oil according to our process, we mix the oil with an alkali such as sodium carbonate, in the proportion of about 1 lb. of sodium carbonate to 10 gals. of oil. This mixture is introduced through the pipe 40 and is pumped by the pump 31 through the valve 45 and pipe 43 into the tank 2. The oil is pumped into the tank until it begins to flow from the drain cock 80 connected by a pipe 81 to the overflow pipe 82, arranged in the tank. The supply of oil into the tank through the pipe 43 is then stopped and the motor 34 is started, which causes air to be supplied from the blower 30 through the pipe 36 and delivered therefrom at 37 adjacent the bottom of the tank. The air agitates the chemicals added to the oil and prevents them from settling. The heater 15 is then started and the oil is heated and air is continually blown therethrough.

The heating of the oil and the blowing of air therethrough volatilizes the water and lighter hydrocarbons such as gasoline which pass off through the vent pipe 22. The sodium carbonate neutralizes any acid constituents which may be present, and coagulates the small particles of carbon and other impurities, thereby facilitating filtering. When the desired temperature of the mixture of oil and chemicals in the tank has been reached, the thermostat 17 automatically shuts off the current to the heating coil 15 and lights the signal light 18. The temperature to which the oil is subjected depends upon what flash point oil it is desired to produce. If it is desired to produce an oil having a flash point of 400, the oil is heated to a temperature of about 355° F. Ordinarily the heating and blowing occupies from 2 to 2½ hours before the desired temperature is reached.

When the signal lamp 18 is lighted, the operator knows that the treatment of oil in the tank 2 is complete. Diatomaceous earth and purified oil are then pumped into the tank 2. The amount of earth used is about 1 lb. for 10 gals. of oil being purified. About 1 gal. of purified oil is mixed with each pound of earth in order to form a fluid mixture which can be readily pumped into the tank. The earth and purified oil are introduced into the tank through the pipe 40, pump 31, and pipe 43. The mixture of oil, alkali, and diatomaceous earth is then pumped from the tank to the filter 49. During the passage of the oil from the tank to the filter, and during the entire filtering process, air is continually delivered from the blower 30 to the tank 2. The three-way valves 44 and 45 are operated so as to cause the oil which has been treated in the tank 2 to flow through the pipe 50, fitting 51, valve 44, through the pump 31, valve 45 and pipes 46 and 47 to the filter 49. After being filtered the oil passes through a pipe 85 to a storage tank.

In case the filter becomes clogged or for any other reason the pressure in the connections between the oil pump 31 and the filter 49 increases beyond a predetermined limit, the relief valve 57 in the pipe 55 opens, thereby causing the oil to be again delivered to the inlet of the oil pump 31, until such time as the excess pressure in the pipe 47 is lowered and the relief valve 57 closes. When the relief valve 57 is closed the oil from the pump 31 passes through the pipes 46 and 47 to the filter 49, from which it is delivered through the filter outlet 85 to storage tanks.

During treatment of the oil in the tank 2, air is blown through the oil before it is heated. The sodium carbonate is dissolved in water before it is mixed with the oil, and if the mixture were heated without having air blown therethrough the mixture would froth. During the filtering operation the air is continually blown into the tank 2 in order to prevent the combustible vapors which ordinarily pass out of the vent pipe 22 from being sucked into the tank 2 and exploding.

The blowing of air into the mixture of oil and chemicals in the tank 2 lowers the temperature to which it is necessary to heat the oil in order to produce an oil of a predetermined flash point. It tends to break up the emulsion of oil and water, and reduces the vapor pressure of the mixture. The air also scrubs the bottom of the tank and keeps the mixture agitated so as to cause complete reaction of the chemicals with the impurities in the oil.

We have illustrated and described the present preferred form of apparatus, and have described in detail the preferred method of carrying out the process. It is to be understood, however, that the invention may be otherwise embodied or practiced within the scope of the following claims.

We claim:

1. The process of treating used lubricating oil containing lighter hydrocarbons and water, comprising heating in a tank to a temperature sufficient to vaporize the lighter hydrocarbons and water, a mixture of oil, sodium carbonate dissolved in water, and diatomaceous earth, introducing adjacent the bottom of the tank and during the entire heating operation air under pressure to agitate the mixture, and thereafter filtering the mixture while continuing to blow air into the tank.

2. The process of treating used lubricating oil containing lighter hydrocarbons and water, comprising mixing with the oil sodium carbonate and diatomaceous earth in the proportion of about 1 lb. sodium carbonate and 1 lb. diatomaceous earth to 10 gals. of oil, heating the mixture in a tank to a temperature sufficient to vaporize the lighter hydrocarbons and water, and blowing air therethrough during the heating, and thereafter filtering the mixture while continuing to blow air into the tank.

3. The process of treating used lubricating oil containing lighter hydrocarbons and water, comprising mixing with the oil sodium carbonate and diatomaceous earth in the proportion of about 1 lb. sodium carbonate and 1 lb. diatomaceous earth to 10 gals. of oil, heating the mixture in a tank to about 355° F. to vaporize the lighter hydrocarbons and water and blowing air therethrough during the heating and thereafter filtering the mixture while continuing to blow air into the tank.

4. The process of treating used lubricating oil containing lighter hydrocarbons and water, comprising mixing with the oil sodium carbonate and diatomaceous earth in the proportion of about 1 pound sodium carbonate and 1 pound diatomaceous earth to 10 gallons of oil, heating the mixture to about 355° F. in a tank in order to vaporize the lighter hydrocarbons and water and blowing air through the mixture during the heating, and thereafter filtering the mixture while continuing to blow air into the tank.

WALTER G. HOFFMAN.
JAMES R. MILLER.